United States Patent [19]
Ariyavisitakul

[11] Patent Number: 5,694,424
[45] Date of Patent: Dec. 2, 1997

[54] PRE-CANCELLING POSTCURSORS IN DECISION FEEDBACK EQUALIZATION

[76] Inventor: Sirikiat Ariyavisitakul, 62 Society Hill Way, Tinton Falls, N.J. 07724

[21] Appl. No.: 616,420

[22] Filed: Mar. 15, 1996

[51] Int. Cl.$^6$ .............................. H03H 7/30; H03H 7/40; H03K 5/159
[52] U.S. Cl. ............................. 375/233; 375/232
[58] Field of Search ........................ 375/232, 233, 375/341; 455/52.1, 52.3

[56] References Cited

U.S. PATENT DOCUMENTS

| | | | |
|---|---|---|---|
| 4,271,525 | 6/1981 | Watanabe | 375/14 |
| 4,359,778 | 11/1982 | Lee | 375/13 |
| 5,117,291 | 5/1992 | Fadavi-Adekani et al. | 358/167 |
| 5,155,742 | 10/1992 | Ariyavisitakul et al. | |
| 5,228,058 | 7/1993 | Ushirokawa et al. | 375/14 |
| 5,285,474 | 2/1994 | Chow et al. | 375/13 |
| 5,371,471 | 12/1994 | Cheanakeshu et al. | 329/304 |
| 5,513,214 | 4/1996 | Gozzo | 375/232 |
| 5,530,721 | 6/1996 | Inoue et al. | 375/232 |
| 5,533,067 | 7/1996 | Jamal et al. | 375/341 |
| 5,539,774 | 7/1996 | Nobakht et al. | 375/232 |
| 5,541,956 | 7/1996 | Ueda | 375/232 |

*Primary Examiner*—Stephen Chin
*Assistant Examiner*—Mohammad Ghayour

[57] ABSTRACT

The complexity and training time of decision-feedback equalization (DFE) structures for use in broadband wireless communications are reduced. A modified DFE structure is able to pre-cancel postcursors in the received signal without requiring training of the feedback filter. In the modified DFE structure, an estimated channel impulse response is used in the feedback section. The output of the feedback section is passed to the feedforward filter to cancel the postcursors before convolving the result of the cancellation with the feedforward filter tap gains. Therefore, only the feedforward filter needs to be trained. In broadband wireless channels, the modified DFE structure can potentially speed up the training process by ten to twenty times compared to conventional structures.

11 Claims, 3 Drawing Sheets

PRE-CANCELLING POSTCURSORS IN DECISION FEEDBACK EQUALIZATION

FIELD OF THE INVENTION

This invention relates generally to equalization techniques for broadband wireless radio receivers; and, more particularly to an improved decision-feedback equalization technique which does not require iterative training of the feedback filter.

BACKGROUND OF THE INVENTION

Wireless communications have become a focus of worldwide research and commercial activity. Next-generation mobile radio systems will provide a wide variety of integrated multimedia services and increased system capacity. Compared to today's cellular systems, the next-generation mobile and fixed wireless systems will have a much higher channel bit rate capability, e.g., 10 Mbits/s to provide 1 Mbit/s multimedia services to multiple users within each coverage area.

Broadband wireless techniques such as multicarrier modulation and adaptive equalization will be used to overcome the effects of multipath delay spread over mobile radio channels. The symbol rate-delay spread product in a particular wireless application can be on the order of 100. This means that the equalizer must have at least 100 taps. Possible transmission bit rates could range from 10 Mbits/s for outdoor systems to 100 Mbits/s for indoor systems, with the use of quaternary phase shift keying (QPSK), and a maximum channel dispersion of 20 μs for outdoor environments (as specified for the GSM system) and 2 μs for indoor environments.

Simple and inexpensive equalizer structures, such as a decision-feedback equalization (DFE) structure, are useful in broadband wireless environments in which bit rates far exceed the correlation bandwidths. Referring to FIG. 1, a conventional DFE structure 10 consists of a feedforward transversal filter 12 with tap gains 14 $\{a_q\}$, for q=0 ... F−1, and a feedback transversal filter 16 with tap gains 18 $\{b_m\}$, for m=1, ... B. F and B indicate the length of the feedforward filter 12 and the feedback filter 16, respectively.

The tap gains 14, 18 of both the feedforward filter 12 and the feedback filter 16 are adjusted through adaptive algorithms, such as least mean-square (LMS) or recursive least squares (RLS) algorithms. The initial adjustment of these tap gains requires iterative training with known data symbols (training symbols) until convergence is reached.

The role of the feedback filter 16 is to cancel postcursor intersymbol interference (ISI) from past symbols. In wireless systems, ISI is caused by multipath propagation delays and the inherent effects of the radio channel on the amplitude and phase of signals transmitted through the channel. To cancel the postcursor ISI, the feedback filter 16 must estimate the response of the entire system up to the output 20 of the feedforward filter 12. That response includes both the radio channel response and the feedforward filter response. Because the feedforward filter response, which is determined by the tap gains 14 $\{a_q\}$, for q=0 ... F−1, is unknown at the time of training, both the feedforward filter 12 and the feedback filter 16 must be trained simultaneously.

With high bit rate next generation wireless applications and highly dispersive radio channel environments, the number of taps for each of the feedforward filter 12 and the feedback filter 16 will be extremely large. For example, if the memory length of the radio channel is 100 symbol periods, then the span (number of taps) of both the feedforward filter 12 and the feedback filter 16 must be on the order of 100. Fast training is desirable in any data communications system. Eliminating the need to simultaneously train the feedback filter would lead to a significant reduction in complexity and training time.

SUMMARY OF THE INVENTION

The invention is directed to an equalizer structure and a method of training the equalizer structure in a broadband wireless radio system, which is faster than conventional methods. A modified decision-feedback equalization (DFE) structure for fast training comprises a feedforward transversal filter and a feedback section including a weighting network. The modified DFE structure does not require simultaneous training of a feedforward filter and a feedback filter as in conventional practice. Instead, an estimated channel impulse response is used by a weighting network in the feedback section. The output of the feedback section is fed into the feedforward section to pre-cancel post-cursor ISI in one or more delayed versions of the received signal before such one or more delayed versions are convolved with the tap gains of the feedforward filter. The modified DFE structure gives the same output as the conventional DFE structure.

The weighting network in the feedback section convolves the detected data (or training data based on a received version of a known training signal) directly with the estimated channel impulse response. One or more outputs of the feedback section are fed into the feedforward section. The one or more feedback section outputs are subtracted from the one or more delayed versions of the received signal to pre-cancel postcursor ISI in the received signal. By precancelling postcursor ISI, the modified DFE structure only requires training of the tap gains of the feedforward filter and therefore enables faster training.

Other features and advantages of the invention will become apparent from the following detailed description, taken in conjunction with the accompanying drawing, which illustrates, by way of example, the features of the invention.

DETAILED DESCRIPTION

A modified decision-feedback equalization (DFE) technique provided according to the principles of the invention is useful for broadband wireless communications. The modified DFE technique improves outdoor/indoor wireless applications in which symbol rates can far exceed correlation bandwidths. The invention enables minimization of equalizer training complexity to provide fast start-up performance, which is required in applications where there is a desire to transmit short packets.

The modified DFE structure for pre-cancelling postcursors does not require training of a feedback filter. Instead, the taps in a feedback section are set based on the convolution of the trained feedforward filter tap gains with a channel impulse response signal based on an estimate of the channel impulse response.

In an exemplary digital radio receiver, the complex baseband representation of a received signal is given as:

$$r_n(\tau) = \Sigma x_{n-k} h_k(\tau) + \eta_n, \text{ for K equals } -K_1 \text{ to } K_2. \quad (1)$$

$r_n(\tau)$ is the received signal sampled at time $nT+\tau$, where T is the symbol period, and $\tau$ is the symbol timing phase; $x_m$ is the mth transmitted data symbol; $\eta_n$ is the nth sample of additive white Gaussian noise with single-sided power density of $N_o$; and $h_k(\tau) = h(kT+\tau)$ is the kth sample of the (instantaneous) channel impulse response $h(\tau)$. The channel has a finite response such that $h_k(\tau)=0$ for $k<-K_1$ and $k>K_2$. The total memory length K of the channel is $K=K_1+K_2$.

The exemplary receiver embodiment is configured for QPSK modulation. A square-root Nyquist filter with a 30% roll-off is used at both the transmitter and the receiver front end.

Figure 2:
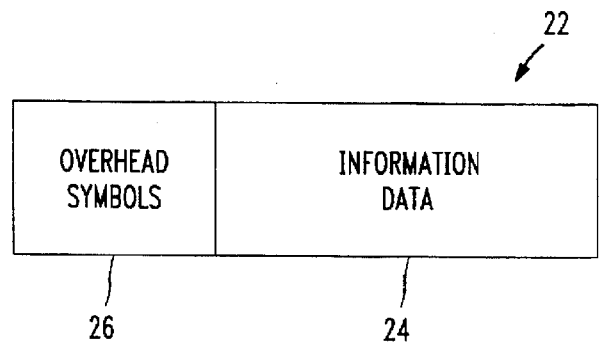
FIG. 2 is a schematic view of a packet of data.

The information data of each user are transmitted in either isochronous (e.g., TDMA) or asynchronous packets. Referring to FIG. 2, the number of information bits in each packet 22 (referred to as "packet length") is varied as a parameter from 400 to 4000 bits. In addition to information data 24, each packet 22 contains overhead symbols 26. The overhead symbols include (a) initial guard symbols for energy detection and adaptive gain control (AGC) acquisition, and (b) a sync word used for burst synchronization as well as channel estimation and/or equalizer training. The length of the sync word depends on the maximum channel dispersion. To be useful in broadband wireless applications, the equalizer used in the receiver should be able to handle channels with severe dispersion lengths, e.g., up to 100 symbol periods.

The conventional decision-feedback equalization (DFE) structure 10 (FIG. 1) includes a feedforward transversal filter 12 and a feedback transversal filter 16. The lengths or spans (number of taps in a delay line) of the feedforward filter 12 and the feedback filter 16 are denoted F and B, respectively.

The tap gains of both the feedforward filter 12 and the feedback filter 16 are adjusted based on the known minimum mean-square error (MMSE) criterion. This adjustment requires training with known symbols to solve the tap gain equations through adaptive techniques, such as least mean-square (LMS) or recursive least squares (RLS) algorithms.

Figure 3:
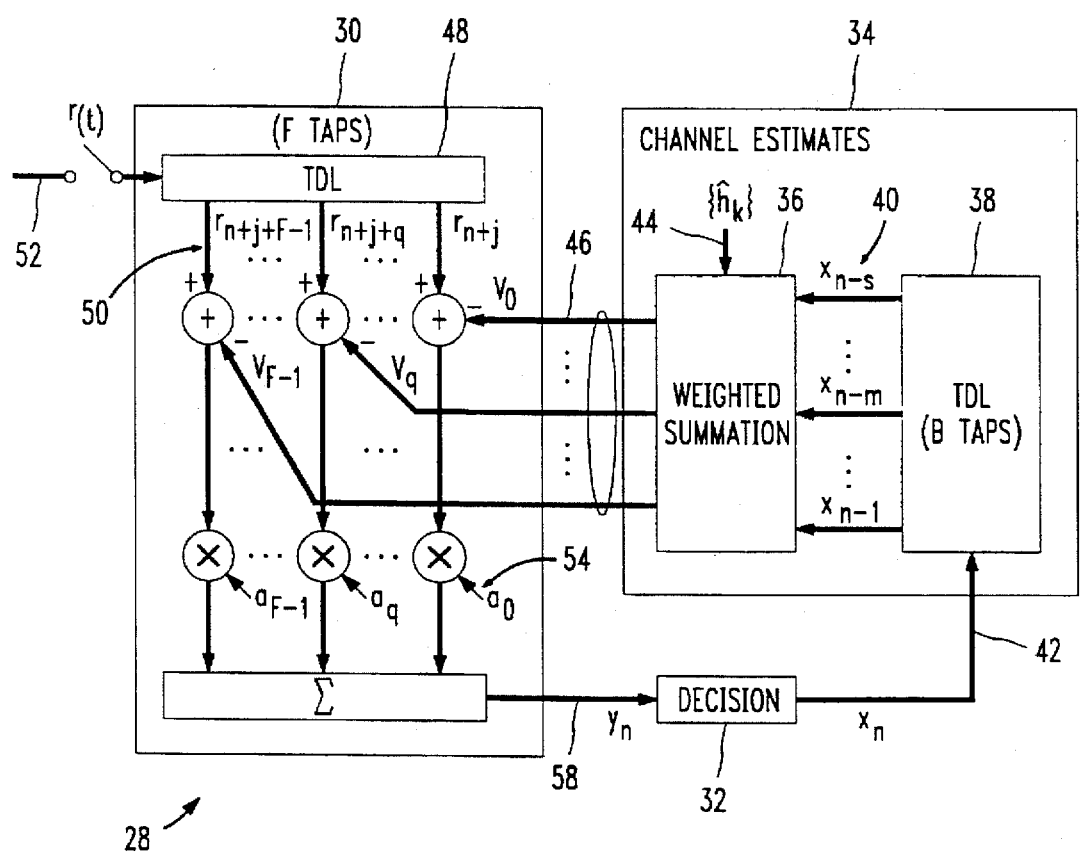
FIG. 3 is a schematic view of a modified DFE structure according to the principles of the invention.

Referring to FIG. 3, the modified DFE structure 28 comprises a feedforward filter 30, a decision means 32, and a feedback section 34. The feedback section 34 includes a weighting network 36 and a tapped delay line (TDL) 38.

Tapped delay line (TDL) 38 outputs one or more delayed versions 40 of detected data 42 input to TDL 38 from the decision means 32. The weighting network 36 convolves the one or more delayed versions 40 of detected data (or training data based on a received version of a known training signal) directly with the channel impulse response signal 44, which is based on the estimated channel impulse response. The weighting network 36 generates one or more feedback section outputs 46. The one or more feedback section outputs 46 are fed into the feedforward filter 30.

The feedforward filter 30 comprises a tapped delay line (TDL) 48 which outputs one or more delayed versions 50 of a received signal 52 input to TDL 48. The one or more feedback section outputs 46 are subtracted from the one or more delayed versions 50 of the received signal 52 to precancel postcursor (past symbol) ISI in the received signal 52.

The modified DFE structure 28 (FIG. 3) only requires training of the tap gains $\{a_q\}$, for $q=0 \ldots F-1$, of the feedforward filter 30. This arrangement substantially reduces the cost and complexity of training the DFE structure for detecting actual data.

The sync word in the overhead symbols (FIG. 2) is used to estimate the channel impulse response. The length of the sync word must be at least equal to $2(K+1)$. Channel estimation is performed by correlating the received version of a transmitted sync word with the transmitted sync word. The same sync word can also be used to train the equalizer.

In the modified DFE structure 28 (FIG. 3), $r_n(\tau)$ is written as $r_n$, and $h_k(\tau)$ is written as $h_k$. $\{a_q\}$ are the feedforward filter tap gains 54, where $q=0$ to $F-1$. j indicates the burst timing.

The feedback section 34 uses the weighting network 36 to convolve detected data (or training data) directly with the estimated channel impulse response $\{h_k\}$. The outputs 46 $\{V_q\}$ of the feedback section 34, for $q=0$ to $F-1$, are passed to the feedforward filter 30 to pre-cancel postcursor ISI in the received signal 52 r(t). In FIG. 3: $V_q = \Sigma x_{n-m} h_{j+q+m}$ for m equals 1 to B; in which $x_{n-m}$ is the detected data, and $h_{j+q+m}$ is the channel estimate. $r_{n+j+q}$ is the received signal sample, in which n is the symbol number, j is the burst timing, and q is the increment of delay within the span of the feedforward filter.

Figure 1:
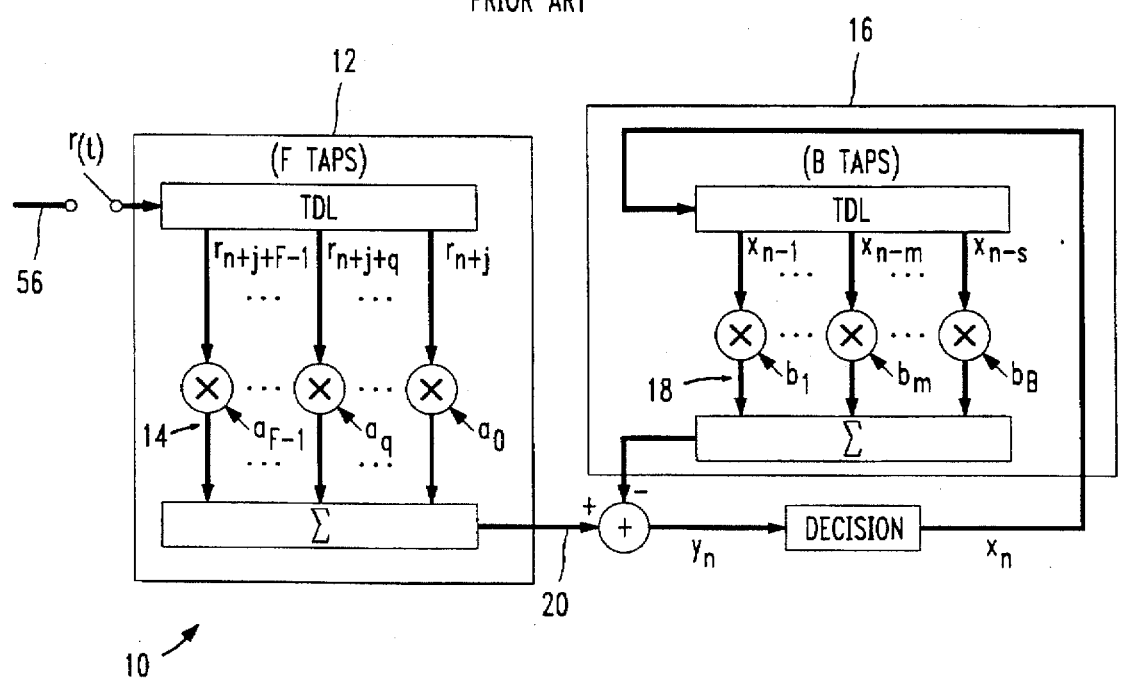
FIG. 1 is a schematic view of a conventional decision-feedback equalization (DFE) structure.

Referring to FIG. 1, the output $y_n$ of the conventional DFE structure 10 can be expressed:

$$y_n = \Sigma a_q r_{n+j+q} - \Sigma x_{n-m} b_m, \text{ for } q \text{ equals 0 to } F-1 \text{ and for } m \text{ equals 1 to } B. \quad (2)$$

$\{a_q\}$ and $\{b_m\}$ are the feedforward filter tap gains 14 and the feedback filter tap gains 18, respectively.

Substituting Eq. (1) into Eq. (2) and assuming that the feedback filter 16 (FIG. 1) cancels all the past-symbol (postcursor) ISI in the received signal 56:

$$y_n = \Sigma a_q (\Sigma x_{n+j+q-k} h_k + \eta_{n+j+q}) - \Sigma x_{n-m} b_m, \text{ for } q \text{ equals 0 to } F-1 \text{ and for } m \text{ equals 1 to } B, \quad (3)$$

$$y_n = \Sigma a_q (\Sigma x_{n+j+q-k} h_k + \eta_{n+j+q}), \text{ for } q \text{ equals 0 to } F-1 \text{ and for } k \text{ equals } -K_1 \text{ to } j+q. \quad (4)$$

In the absence of channel estimation errors, the output 58 $y_n$ of the modified DFE structure 28 depicted in FIG. 3 is:

$$y_n = \Sigma a_q (r_{n+j+q} - V_q), \text{ for } q \text{ equals 0 to } F-1, \quad (5)$$

$$y_n = \Sigma a_q (r_{n+j+q} - \Sigma x_{n-m} h_{j+q+m}), \text{ for } q \text{ equals 0 to } F-1 \text{ and for } m \text{ equals 1 to } B, \quad (6)$$

$$y_n = \Sigma a_q (\Sigma x_{n+j+q-k} h_k + \eta_{n+j+q}), \text{ for } q \text{ equals 0 to } F-1 \text{ and for } k \text{ equals } -K_1 \text{ to } j+q. \quad (7)$$

Equations (4) and (7) are identical. Hence, the two receiver structure outputs are equivalent.

Figure 4:
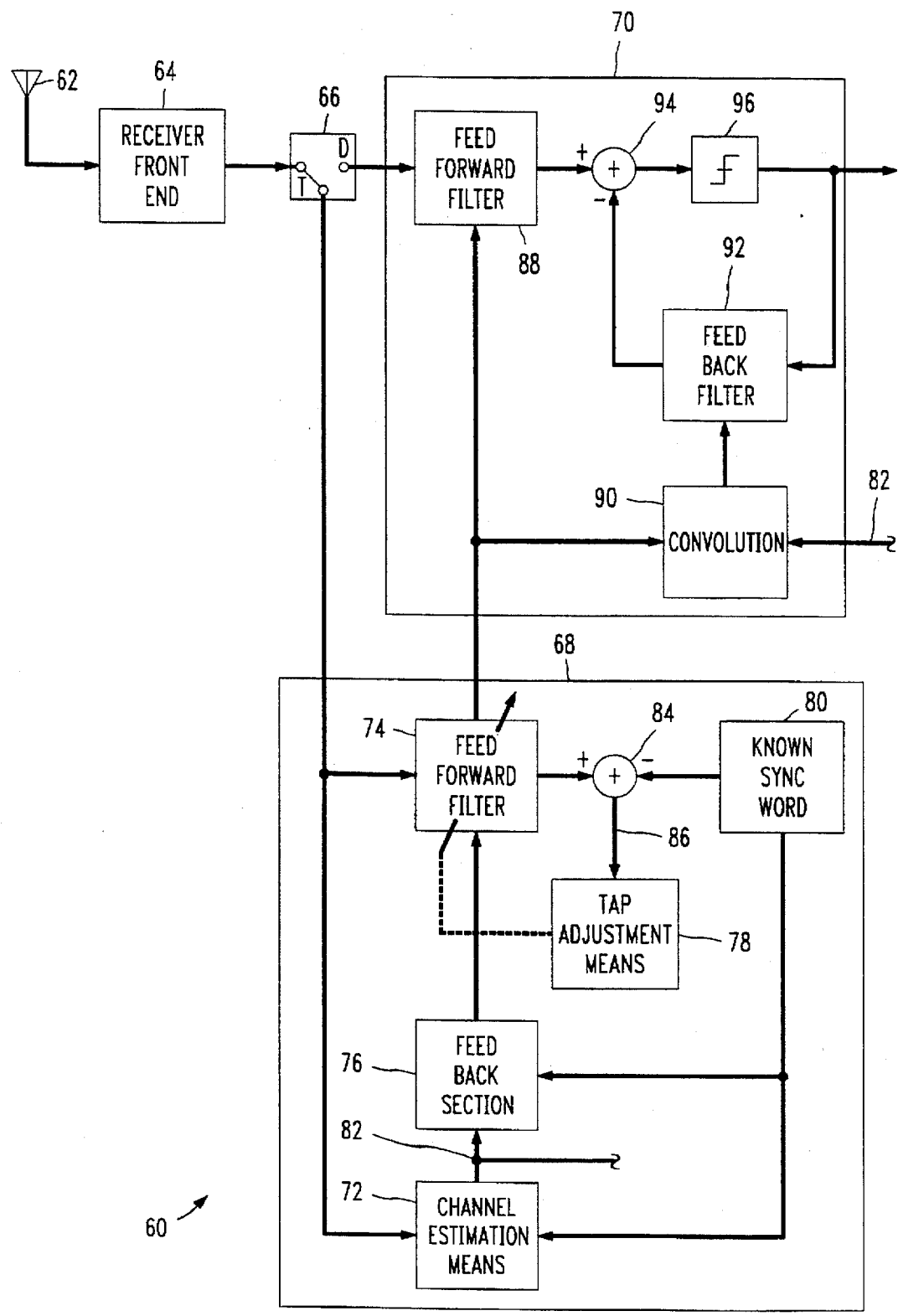
FIG. 4 is a schematic view of the modified DFE structure in a wireless radio receiver according to the principles of the invention.

Referring to FIG. 4, the modified DFE training technique and data detection system is demonstrated in an exemplary wireless radio receiver 60. The receiver 60 includes a receiving antenna 62 for receiving a signal from the radio channel. A receiver front end 64 is coupled to the receiving antenna 62 for demodulating the signal and converting it into a baseband signal. A switch 66 for selecting between a training mode T and a detecting mode D is coupled to the receiver front end 64 and receives the signal from the receiver front end 64.

The receiver 60 includes a training section 68 and a data detection section 70; each is coupled to a corresponding output of the switch 66. When the switch 66 is set to the training mode T, the received signal corresponding to the transmitted training sync word (i.e., the received version of the training sync word), is passed from the training mode T output to the training section 68. The training section 68 comprises a channel estimation means 72, a feedforward filter 74 with adjustable tap gains, a feedback section 76, and tap adjustment means 78.

The channel estimation means 72 is coupled to receive the known sync word 80 and the training mode T output of the switch 66 and can use any one of a number of conventional techniques to estimate the channel's impulse response $\{h_k\}$. In the preferred embodiment, the estimate of the channel impulse response is determined by correlating the received version of a known training sync word with the known training sync word.

In training, the same sync word can be used repeatedly. In that case, the received version of the sync word is stored and used repeatedly as the input to the feedforward filter 74.

The output 82 of the channel estimation means 72 is passed to the feedback section 76. The channel estimate 82 is used to determine the postcursors within the training signal (i.e., the received version of the sync word) that will be cancelled. The postcursors determined in the feedback section 76 are passed to the feedforward filter 74 to cancel the postcursors in the training signal before convolving (in the feedforward filter 74) the result of that cancellation with the feedforward filter tap gains.

The output of the feedforward filter 74 is passed to a first summing component 84. The known sync word 80 is passed to the first summing component 84 and to the feedback section 76.

The first summing component 84 subtracts the known sync word 80 from the output of the feedforward filter 74 to generate an error signal 86. The error signal 86 is passed to the tap adjustment means 78. The tap adjustment means 78 employs any one of a number of conventional tap adjustment algorithms (e.g., LMS or RLS) to minimize the mean-square error. The output of the tap adjustment means 78 is used to set and update the tap gains of the feedforward filter 74.

When training is culminated, the iteratively adjusted tap gains of the feedforward filter 74 in the training section 68 are used to set the tap gains of a feedforward filter 88 in the data detection section 70. Those same feedforward filter tap gains are convolved 90 with the estimated channel impulse response 82 to determine and set the tap gains of a feedback filter 92 in the data detection section 70 of the receiver 60.

In the data detection section 70, the feedforward filter 88 is coupled to the detection mode D output of the switch 66. The output of the feedforward filter 88 in the detection section 70 is passed to a second summing component 94. The output of the second summing component 94 is passed to a decision means 96 for making a decision on the transmitted data symbols. The output of the decision means 96 is passed to the feedback filter 92 in the data detection stage 70. The output of the feedback filter 92 is passed to the second summing component 94. The second summing component 94 subtracts the output of the feedback filter 92 from the output of the feedforward filter 88. The decision means 96 decides and outputs detected data in operation.

In another specific embodiment, the DFE structure in the data detection section 70 undergoes a subsequent optional round of conventional training to make it less susceptible to noisy channel estimates. This accomplishes a form of fine-tuning. After such optional fine-tuning, the receiver can be operated to detect data. The DFE structure used in the data detection section 70 can be either a conventional DFE structure (as shown in FIG. 4) or the modified DFE structure 28 (FIG. 3).

While several particular forms of the invention have been illustrated and described, it will also be apparent that various modifications can be made without departing from the spirit and scope of the invention.

What is claimed is:

1. An equalizer structure for use in a broadband wireless radio receiver for receiving a transmitted signal from a radio channel, comprising:

a feedforward filter for generating a feedforward signal based on the transmitted signal;

decision means coupled to the feedforward filter for generating detected data based on the feedforward signal; and a feedback section coupled to the decision means including a means for estimating an impulse response of the radio channel and generating a channel impulse response signal, and a weighting network for convolving one or more versions of the detected data with the channel impulse response signal; wherein the feedforward filter includes a first tapped delay line having one or more taps;

the feedback section includes a second tapped delay line having one or more taps, and the second tapped delay line generates the one or more versions of the detected data; and the feedback section is coupled to the feedforward filter, and the feedback section generates one or more feedback outputs.

2. The equalizer structure of claim 1, wherein:

the one or more feedback outputs are coupled to the first tapped delay line to cancel postcursor intersymbol interference in the transmitted signal.

3. An equalizer structure for use in a broadband wireless radio receiver for receiving a transmitted signal from a radio channel, comprising:

a feedforward filter for generating a feedforward signal based on the transmitted signal;

decision means coupled to the feedforward filter for generating detected data based on the feedforward signal; and a feedback section coupled to the decision means including a weighting network for convolving one or more versions of the detected data with a channel impulse response signal; and further comprising means for estimating an impulse response of the radio channel and generating a channel impulse response signal; wherein the transmitted signal includes a sync word; and the sync word is used to generate the channel impulse response signal.

4. A method of equalization for use in a broadband wireless radio receiver for receiving a radio signal from a radio channel, comprising the following steps:

(A) generating a feedforward signal based on the radio signal;

(B) generating detected data based on the feedforward signal;

(C) estimating an impulse response of the radio channel and generating a channel impulse response signal;

(D) generating one or more feedback outputs by convolving one or more versions of the detected data with the channel impulse response signal; and (E) cancelling postcursor intersymbol interference in the radio signal using the one or more feedback outputs; wherein step (A) includes the steps of:

generating one or more versions of the radio signal;

subtracting the one or more feedback outputs from the one or more versions of the radio signal to generate a precanceled signal; and convolving the precanceled signal with one or more feedforward filter tap gains to generate the feedforward signal.

5. A method of training an equalizer structure having a feedforward filter and a feedback section for use in a broadband wireless radio receiver for receiving a radio signal from a radio channel, comprising the following steps:

(A) receiving at the feedforward filter a radio signal based on a known sync word;

(B) cancelling postcursor intersymbol interference in the radio signal to generate a precanceled signal using a channel impulse response signal;

(C) convolving the precanceled signal with one or more tap gains in the feedforward filter to generate an error signal;

(D) adjusting the one or more tap gains in the feedforward filter based on the error signal; and (E) determining one or more tap gains for the feedback section by convolving the channel impulse response signal with the one or more tap gains in the feedforward filter.

6. The method of claim 5, further comprising the step of:

after step (E), fine-tuning the feedforward filter and the feedback section using a conventional training technique.

7. The method of claim 5, further comprising the step of:

generating the channel impulse response signal using the known sync word.

8. The method of claim 5, further comprising the step of:

repeating step (A) through step (D) for a preselected number of iterations.

9. The method of claim 8, wherein:

the same known sync word is used for the preselected number of iterations.

10. The method of claim 5, further comprising the step of:

setting the one or more tap gains in the feedforward filter when the error signal converges to a preselected value.

11. The method of claim 5, further comprising the step of:

after step (E), operating the receiver to detect actual data.

* * * * *